(12) United States Patent
Winklhofer et al.

(10) Patent No.: US 7,499,477 B2
(45) Date of Patent: Mar. 3, 2009

(54) INTERNAL COMBUSTION ENGINE

(75) Inventors: Ernst Winklhofer, St. Johann Ob Hohenburg (AT); Georg Franz, Villach (AT); Gerhard Kroupa, Villach (AT); Volker Mannheim, Landskron (AT); Alfred Binder, Landskron (AT)

(73) Assignee: AVL List GmbH, Graz (AT)

( * ) Notice: Subject to any disclaimer, the term of this patent is extended or adjusted under 35 U.S.C. 154(b) by 304 days.

(21) Appl. No.: 10/573,115

(22) PCT Filed: Sep. 23, 2004

(86) PCT No.: PCT/AT2004/000320

§ 371 (c)(1),
(2), (4) Date: May 5, 2006

(87) PCT Pub. No.: WO2005/028856

PCT Pub. Date: Mar. 31, 2005

(65) Prior Publication Data

US 2007/0064746 A1 Mar. 22, 2007

(30) Foreign Application Priority Data

Sep. 23, 2003 (EP) .................. 03021446
Dec. 23, 2003 (EP) .................. 03450285

(51) Int. Cl.
*H01S 3/11* (2006.01)
(52) U.S. Cl. ............................. 372/10; 372/34
(58) Field of Classification Search ............... 372/10, 372/34
See application file for complete search history.

(56) References Cited

U.S. PATENT DOCUMENTS

| 4,416,226 | A |   | 11/1983 | Nishida et al. |          |
|-----------|---|---|---------|----------------|----------|
| 4,979,180 | A | * | 12/1990 | Muncheryan     | 372/92   |
| 6,347,101 | B1| * | 2/2002  | Wu et al.      | 372/18   |
| 6,413,077 | B1|   | 7/2002  | Early et al.   |          |
| 2007/0121689 | A1 | * | 5/2007 | Brown        | 372/39   |

FOREIGN PATENT DOCUMENTS

| EP | 0987799 | 3/2000 |
| WO | 9927621 | 6/1999 |

* cited by examiner

*Primary Examiner*—Dung T. Nguyen
(74) *Attorney, Agent, or Firm*—Dykema Gossett PLLC

(57) ABSTRACT

The invention relates to an internal combustion engine with a laser ignition device (1), Q-switched, pumped solid-state laser with a pulsed pumped light source (30), a solid laser crystal (2), enclosed in a resonator, a Q-switch (4), for increasing the power density, at least one output mirror (6) and a focussing device (7), by means of which the laser beam (26) may be focussed in a combustion chamber.

42 Claims, 3 Drawing Sheets

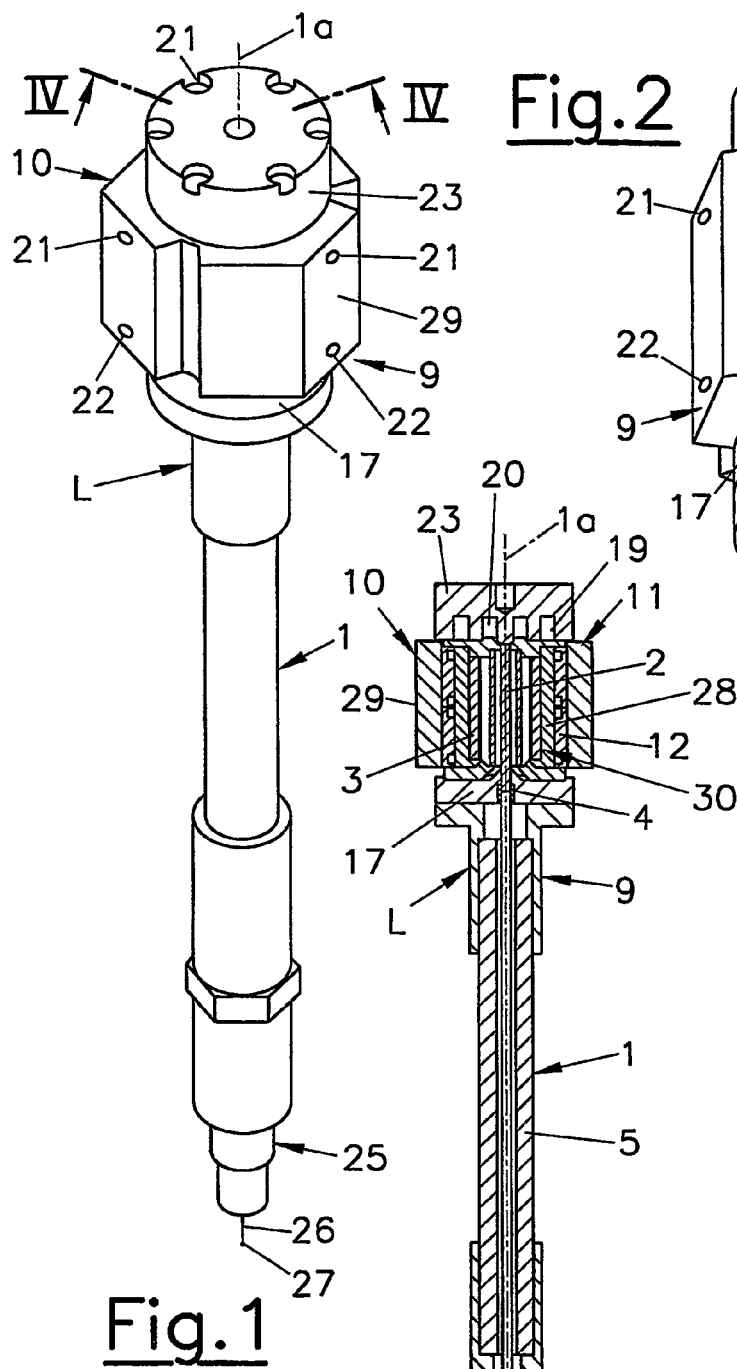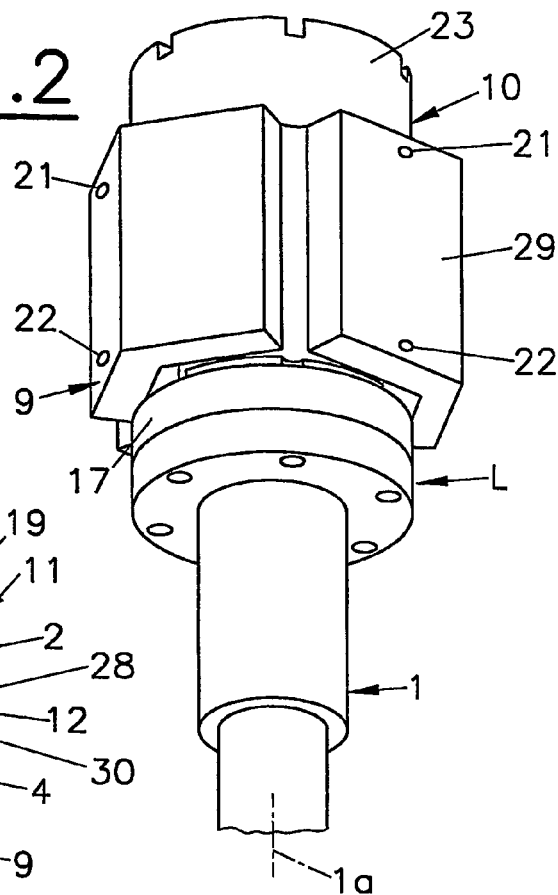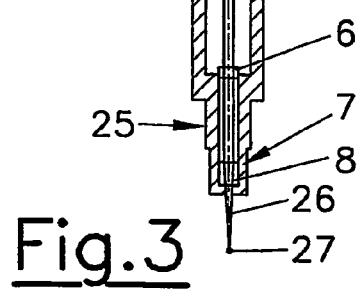

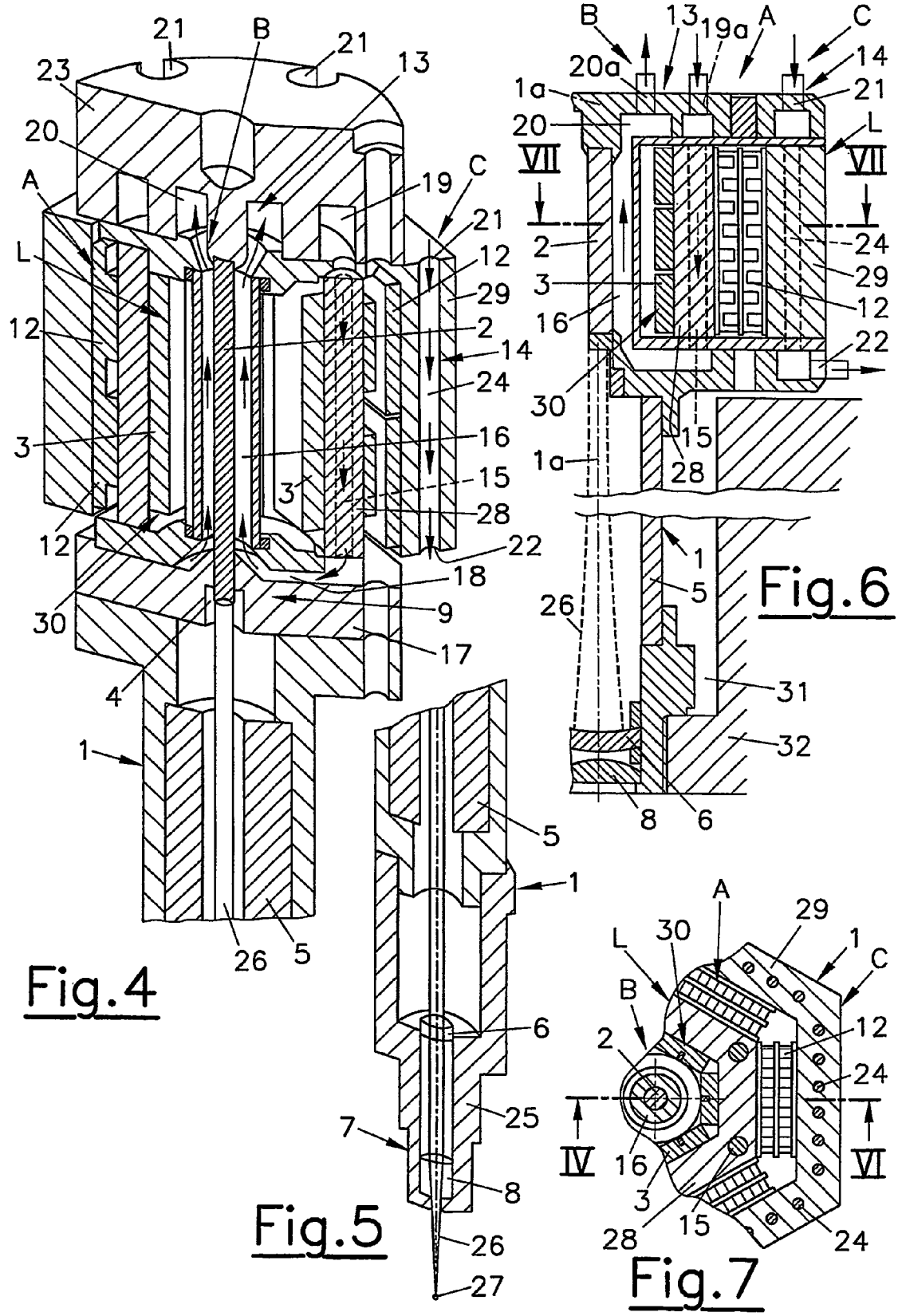

INTERNAL COMBUSTION ENGINE

BACKGROUND OF THE INVENTION

1. Field of the Invention

The invention relates to an internal combustion engine with a laser ignition device, comprising a Q-switched, pumped solid-state laser with a pulsed pumped light source, a solid laser crystal embedded in a resonator, a Q-switch for increasing the power density, at least one output mirror and a focusing device, by means of which the laser beam may be focused in a combustion chamber.

The invention further relates to a Q-switched, pumped solid state laser, especially for a laser ignition device of an internal combustion engine, comprising a pulsed pumped light source formed by pump diodes, a solid laser crystal embedded in a resonator, a Q-switch for increasing the power density, at least one output mirror and a focusing device, with a cooling device being provided comprising at least one Peltier cooling element for cooling the resonator.

2. The Prior Art

Q-switched, pumped solid state lasers are especially suitable as laser ignition devices in internal combustion engines.

A laser ignition device for an internal combustion engine is known from U.S. Pat. No. 4,416,226 A, with the resonator of the laser plus photo-optical focusing device being screwed into a cylinder head bore in such a way that the ignition device opens directly into the combustion chamber. The laser ignition device applies the principle of a solid state laser with a pulsed pumped light source. This leads to the advantage that high pulse energies can be achieved with a relatively low input of power. A flash lamp is used as a pumped light source. In order to increase the power density, an actively switchable Q-switch is used. In so-called "Q-switching", the energy is stored in the laser cavity during the pumping process of the active medium and released during a very short emission period. This results in an extremely high-energy laser pulse. Actively switchable Q-switches come with the disadvantage however that a considerably complex circuitry is required for the control and that they are less suitable for rapid sequences of pulses. The photo-optical device of the known laser ignition apparatus comprises three lenses. In combination with the active Q-switch and the pumped light source formed by the flash lamp, the most serious disadvantage is that the device cannot be housed entirely in a component to be screwed into a spark plug shaft. The specification does not provide any information about the cooling of the laser crystal and the light source as required in pumped solid state lasers.

U.S. Pat. No. 6,413,077 B1 describes a laser ignition device in which several lasers are used, namely an excitation laser and an ignition laser. The pulses of the excitation laser and the ignition laser are added up by means of a Q-switch and the power density required for ignition is made available. This known ignition device comes with the disadvantage of a very high constructional complexity and requires a lot of overall space in order to be used instead of a spark plug in an internal combustion engine.

Although the need for compact laser ignition devices has existed for a long time, there have not been any concrete constructional proposals for compact laser ignition devices for internal combustion engines. The publications U.S. Pat. No. 4,434,753 A and DE 37 36 442 A only show purely schematic illustrations of ignition devices in this respect. Components such as cooling devices which usually require a lot of overall space are missing, which is why these systems are not yet suitable for practical use in internal combustion engines.

The use of laser ignition instead of spark ignition offers a number of advantages. On the one hand, the place of ignition plasma which can be chosen relatively freely does not require any material structure which might impair the combustion process. Moreover, the high ignition pressures as occur in gas engines are beneficial to laser ignition because the required pulse energy decreases at higher pressures. Even leaner mixtures can be achieved with laser ignition, thus enabling the achievement of very low $NO_x$ emission values.

It is known from literature that a laser focused to a sufficiently small focus diameter leads with sufficient intensity to plasma formation and to a local increase of temperature and thus to an ignition of an explosive mixture. For practical gas mixtures, the avalanche effect of free electrons is used predominantly for explaining the plasma formation. The effect is then virtually independent of the employed wavelength.

U.S. Pat. No. 5,673,550 A describes the ignition of fuel droplets under plasma formation within the fuel-air mist by means of a laser pulsed via a coherent light source.

It is known to use pump diodes in pumped solid state lasers. In comparison with flash lamps, pump diodes come with the advantage of higher efficiency. In the case of solid state lasers pumped with pump diodes, the problem occurs that the pump diodes can only be operated within a very narrow temperature band. Excessive temperatures would drastically reduce the service life of the pump diodes.

U.S. Pat. No. 5,187,714 A describes a laser-diode-pumped solid state laser, with a Peltier device being provided for cooling. Diode-pumped solid state lasers cooled with Peltier elements are known from the publications JP 11-002849 A, JP 10-200177 A, JP 09-232665 A, JP 04-157778 A and JP 03-041787 A.

Cooling alone by Peltier elements is not sufficient for the use as an ignition device in internal combustion engines. Furthermore, the cooling is subject to further difficulties by the demand that the laser ignition device should be constructed in the highest compact manner and should be housed in the spar plug dome of a cylinder head of an internal combustion engine.

It is the object of the present invention to provide a temperature-stabilized solid state laser which is suitable for practical use in internal combustion engines as a laser ignition device, which only requires little space and which can be used in internal combustion engines with only little constructional effort.

SUMMARY OF THE INVENTION

This is achieved in accordance with the invention that the pumped light source, resonator plus laser crystal, Q-switch, output mirror, focusing device and a cooling device for cooling the resonator are integrated in a single component which can be inserted into a spark-plug shaft.

High pulse energies can be achieved by using a Q-switched, pumped solid state laser. The most relevant elements are combined in a compact fashion in a single component which can be screwed into the spark-plug shaft of an internal combustion engine instead of a spark plug.

It is preferably provided that the pumped light source is formed by pump diodes. Pump diodes have the advantage of a higher efficiency in comparison with flash lamps.

In order to achieve a thermal stabilization, it is provided in a preferred embodiment of the invention that the cooling device comprises at least two, preferably three different cooling systems, with Peltier cooling elements being associated with the first cooling system for cooling the pump diodes.

Since the wavelength of the pump diodes changes with the temperature of the laser substrate and the laser crystal only has a very narrow absorption line, the pump diodes need to be thermally stabilized. Examinations have shown that at least two, preferably three different cooling systems are advantageous for a thermal stabilization of the resonator. Since the pump diodes need to be operated at a substantially lower temperature level than the cooling water temperature, the use of thermoelectric cooling elements (Peltier cooling elements) is required in this case. At least the first cooling system therefore comprises at least one Peltier cooling element. It is provided in this respect that the resonator comprises a second cooling system with an inner coolant circulation for cooling the laser crystal and/or the pump diodes. It is preferably provided that the pump diodes are enclosed by a heat dissipater which is preferably arranged in a concentric manner to the laser crystal, with the heat dissipater preferably consisting of copper. The heat of the inner circulation is dissipated via the heat dissipater to the at least one Peltier cooling element. It is provided in this respect that the pump diodes are enclosed by at least one row of first outer cooling channels of the first coolant circulation, which cooling channels are arranged at least in a row in a direction of the axis of the solid state laser. The first outer cooling channels are preferably arranged in the heat dissipater. In order to achieve favorable cooling it is especially advantageous when the Peltier cooling elements are arranged in a concentric manner to the axis of the solid state laser outside about the pump diodes. The heat dissipater is preferably arranged between the pump diodes and the Peltier cooling elements. It is especially advantageous when the resonator comprises at least one third cooling system defining an outer coolant circulation for dissipating the heat from the Peltier cooling element. The Peltier cooling elements are enclosed by a heat exchanger of the third cooling system with second cooling channels arranged in the direction of the axis of the solid state laser. The temperature-controlled cooling water of the internal combustion engine is appropriate for use of at least one cooling system, namely the third cooling system comprising the outer coolant circulation. The cooling water of the internal combustion engine is not suitable for the inner cooling circulation because no absorption may occur at the wavelength of the pump radiation and no phase transition may occur during the heating.

At least one of the cooling systems can also be used for heating the pump diodes. It is especially advantageous when during cold starting the pump diodes can be heated to operating temperature by the Peltier cooling element.

The laser crystal can principally either consist of ND:YAG (neodymium:YAG) or of ND:YVO$_4$ (neodymium:vanadate). ND:YAG is widely available, inexpensive and mechanically resilient, but has a far narrower absorption line than ND:YVO$_4$. The use of ND:YAG laser crystals thus requires an especially good cooling device.

A very effective heat dissipation from the laser crystal is achieved when the laser crystal is enclosed by at least one preferably annular first inner cooling channel of the inner coolant circulation.

Pumped light source, resonator plus laser crystal, Q-switch, output mirror, focusing device and cooling device for cooling the resonator are preferably integrated in a single module which can be inserted in a spark-plug shaft.

High pulse energies can be achieved by using a Q-switched, pumped solid state laser. The most essential elements are combined in a compact way in a single component which can be screwed instead of a spark plug into a spark-plug shaft of an internal combustion engine.

Laser diodes are operated with a pulse energy of some mJ and approx. 100 to 200 μs in pulsed operation, as a result of which the output per diode remains limited to a few 10 W.

High-performance laser diodes consist of an array of numerous individual diodes and thus achieve a very high pulse energy. The laser beam can be focused only very badly as a result of the large emission surface and the non-continuous distribution (low quality). The long resonator ensures that a substantially higher beam quality and thus a smaller focus diameter can be achieved with a solid state laser.

The pulsed solid state laser is composed of the four main components of pump diodes, crystal rod, resonator with output mirror, Q-switch and focusing device. Through the irradiation of the pump diodes, meta-stable energy levels are excited in the laser crystal and the energy is thus stored. As a result of a low spontaneous emission, the laser crystal begins to emit light at the laser wavelength (1064 nm).

For amplification and coherence of the light, the laser crystal is embedded in an optical resonator whose quality is increased in a pulsed manner with the Q-switch upon reaching the desired power density. A short, high laser pulse is thus obtained at the output mirror. A passive Q-switch is used, which on the one hand allows high amplification and on the other hand short energy pulses without any complex control unit.

The geometry of the resonator is obtained from the demand that the pump diodes need to be arranged at the upper end of the spark-plug shaft (for use as a laser ignition device). The largest possible distance is required between the laser crystal and the output mirror in order to achieve a high quality. This leads to the oblong shape, with the head region with laser crystal being located at the one end and the output mirror at the other end of a tube body.

Adjacent to the output mirror there is a focusing device which consists of a single focus lens. This leads to a very small overall size.

In order to enable a very compact configuration of the ignition device, it is provided for within the scope of the invention that several pump diodes are arranged concentrically about the laser crystal. Preferably at least three and more preferably at least six pump diodes are arranged evenly about the laser crystal. The pump diodes are advantageously switched in series. The laser crystal is thus laterally pumped by the pump diodes, i.e. in a radial manner. For the purpose of increasing the pulse energy, it is also possible to arrange several rings of pump diodes in a concentric successive manner about the laser crystal.

The invention is explained below in closer detail by reference to the drawing.

BRIEF DESCRIPTION OF THE DRAWINGS

FIG. 1 shows a laser ignition device with a solid state laser in accordance with the invention in an oblique view;

FIG. 2 shows the head part of the laser ignition device in detail in an oblique view;

FIG. 3 shows the laser ignition device in a longitudinal sectional view;

FIG. 4 shows the head part of the laser ignition device in an oblique sectional view according to line IV-IV in FIG. 1;

FIG. 5 shows the base part of the laser ignition device in an oblique sectional view;

FIG. 6 schematically shows the laser ignition device in a longitudinal sectional view according to line VI-VI in FIG. 7;

FIG. 7 shows the laser ignition device in a sectional view according to line VII-VII in FIG. 6.

Figure 8:
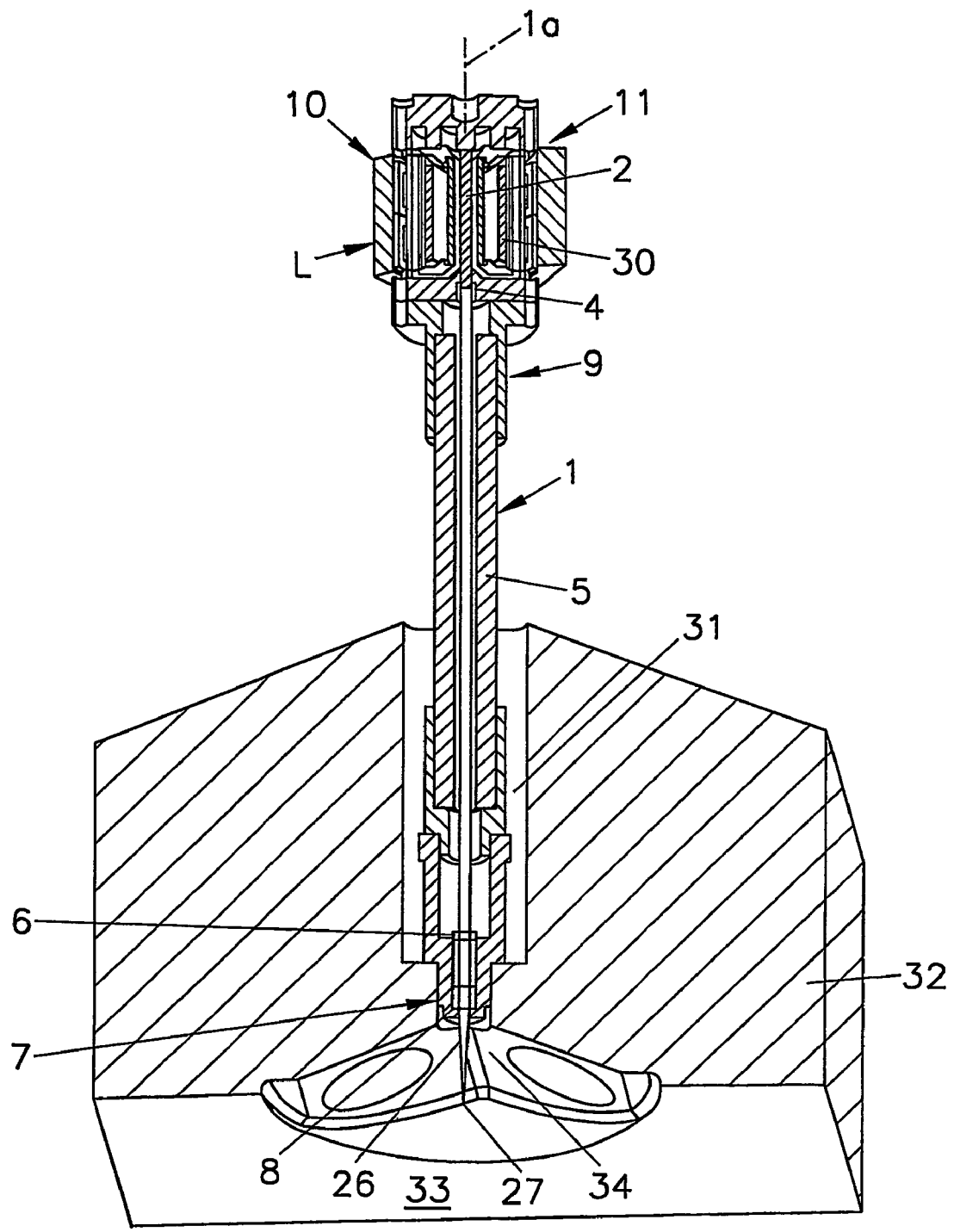
FIG. 8 shows a cylinder head with an installed laser ignition device.

The solid state laser L for the laser ignition device 1 consists of the main components laser crystal 2, pumped light source 30, a passive Q-switch 4, a tube body 5, output mirror 6 and focusing device 7 with a focusing lens 8 and a cooling device 11.

DETAILED DESCRIPTION OF THE PREFERRED EMBODIMENT

High efficiency can be achieved when the pumped light source 30 is formed by pump diodes 3.

Meta-stable energy levels are excited in the laser crystal 2 via irradiation of the pump diodes 3 (808 nm) and the energy is thus stored. As a result of a low spontaneous emission, the laser crystal 2 begins to emit light at laser wavelength (1064 nm).

For amplification and coherence of the light, the laser crystal 2 is embedded in an optical resonator 9 whose quality is increased in a pulsed manner with the passive Q-switch 4 upon reaching the desired power density. A short, strong laser pulse 26 is thus obtained at the output mirror 6.

Individual pump diodes 3 are connected in series and are arranged in an annular fashion on the side about the laser crystal 2.

Due to strongly limited life at higher operating temperatures, the pump diodes 3 need to be operated at a relatively low temperature of approx. 30° C. Moreover, the wavelength of the pump diodes 3 changes with the temperature. Since the rod-like laser crystal 2 which consists of neodymium:YAG (ND:YAG) has a very narrow absorption line, the pump diodes 3 need to be thermally stabilized. The cooling device 11 is provided for this purpose in the head region 10 of the laser ignition device 1.

The cooling device 11 comprises three different cooling systems A, B, C. The first cooling system A comprises Peltier cooling elements 12 which are distributed in an annular manner about the heat dissipater 28. The cooling systems B, C with two liquid cooling circulations 13, 14 are further provided for better heat dissipation. The coolant of the inner cooling circulation 13 flows through the head part 10 substantially in the direction of axis 1a of the solid state laser L.

The inner cooling circulation 13 has the task of thermally stabilizing the laser crystal 2 and of transmitting its lost heat to the heat dissipater 28. The laser crystal 2 is enclosed by at least one first inner cooling channel 16 which can be configured as an annular channel, as is shown in FIG. 7. Instead of the annular channel it is also possible to arrange several first inner cooling channels 16 around the laser crystal 2. The coolant is supplied to the first inner cooling channel 16 via at least one inlet opening 19a and an annular distribution chamber 19 and is discharged again via an annular collecting chamber 20 and outlet openings 20a. The lost heat of the laser crystal 2 is transmitted at least partly to the flange plate 17 and the connecting plate 23 when flowing through the annular chambers 19, 20; these will then transmit the heat through thermal conduction to the heat dissipater 28.

The heat dissipater 28 can optionally also comprise axial second inner cooling channels 15, as indicated by the broken lines in FIG. 4 and FIG. 6. The cooling medium passes through inlet openings 19a into the annular distribution chamber 19, flows through the second inner cooling channels 15 of the heat dissipater 28 and is guided via the transfer channel 18 to the annular first inner cooling channel 16. It then flows through the annular collecting chamber 20 and the outlet openings 20a to an external pump.

The outer cooling circulation 14 comprises inlet openings 21 in the outer heat exchanger 29 which lead to the outer cooling channels 24 and further to outlet openings 22. The coolant which is formed for example by water reaches the outer cooling channels 24 via the inlet openings 21, flows through the outer heat exchanger 29 and leaves the laser ignition device 1 again in the region of the outlet openings 22. The outer cooling channels 24 are used especially to dissipate heat from the Peltier cooling elements 12 via the outer heat exchanger 29.

The cooling device 11 consisting of three cooling systems A, B, C (which are the Peltier cooling elements 12, the inner cooling circulation 13 and the outer cooling circulation 14) allows using neodymium:YAG as the material for the laser crystal 2 and pump diodes 3 as pumped light source, which material is widely available, inexpensive and can be strained mechanically in a very favorable way. The cooling device 11 allows thermally stabilizing the pump diodes 3 to approximately 30° C., which has an advantageous effect on their service life. On the other hand, the thermal stabilization ensures that the wavelength of the pump diodes 3 will always remain within the narrow absorption line of the laser crystal 2.

The laser crystal 2 is mirrored in the region of the face-side connecting plate 23 for the laser wavelength (1064 nm) and coated in an anti-reflective way at the other end. The shape of the laser ignition device 1 is obtained from the demand that it should be installable instead of a spark plug in the spark plug shaft 31 of a cylinder head 32 and the boundary condition that the pump diodes 3 must be arranged in the head region 10 of the laser ignition device 1. For achieving a higher beam quality there should be the largest possible distance between the laser crystal 2 and the output mirror 6. The output mirror 6 is therefore arranged in the base region 25 of the laser ignition device 1 close to the combustion chamber. Shortly after the output mirror 6 there is the focusing device 7 with a single focusing lens 8 which simultaneously forms the window to the combustion chamber and is arranged as a plano-spherical lens. Sapphire is suitable as a material for the focusing lens 8.

The outer cooling circulation 14 can be coupled with the existing water cooling of the engine. Higher optical, qualitative and thermal conditions must be met for the inner cooling circulation, so that a separate coolant is required here.

The pump diodes 3 need to be operated at approximately 30° C. due to the highly limited service life at higher operating temperatures. The lost heat flow is dissipated to the Peltier cooling elements 12 via a heat dissipater 28 which consists of copper, which Peltier elements transform the heat flow to the temperature level of the cooling water of the engine and emit the same via the outer heat exchanger 29.

Since the wavelength of the pump diode 3 shifts with the temperature and the absorption band of the laser crystal 2 is extremely narrow, a rapid and precise temperature control must be provided. The temperature on the cold side should deviate by not more than approx. +/−1.5° C. from the setpoint value. In order to achieve this, the Peltier cooling elements 12 are operated with at least one temperature sensor and a power source in a closed control loop.

Light pulses are supplied to the laser crystal 2 via the preferably six pump diodes 3 which are arranged about the laser crystal 2. Meta-stable energy levels are excited in the laser crystal 2 by way of the irradiation of the pump diodes 3 (808 nm) and the energy is thus stored. As a result of a low spontaneous emission, the laser crystal 2 begins to emit light at the laser wavelength (1064 nm). For amplification and coherence of the light, the laser crystal 2 is embedded in an optical resonator 9 whose quality is increased in a pulsed manner with the passive Q-switch 4 upon reaching the desired power density. A high short laser pulse 26 is thus obtained at the output mirror 6 which is focused via the focusing lens 8 in a focal point 27.

As can be seen from FIG. 8, the laser ignition device 1 with the solid state laser L in accordance with the invention can be arranged in its entirety in the spark plug shaft 31 of a cylinder head 32 of an internal combustion engine. The laser ignition device 1 is thus suitable for use in existing conventional cylinder head concepts for spark-ignited internal combustion engines. In order to keep soiling of the focusing device as low as possible, the focusing lens 8 facing the combustion chamber 33 is flush with the covering surface 34 of the cylinder head.

The invention is not limited to the embodiment(s) of the description. Numerous alterations and modifications are rather possible within the scope of the invention, especially such variants, elements and combinations and/or materials which are inventive for example by combination or modification of individual features and elements or method steps as described in the description, embodiments and claims and as contained in the drawings and lead by combinable features to a new subject matter or to new method steps or sequences of method steps, even insofar as they relate to production, testing and working methods.

The invention claimed is:

1. An internal combustion engine with a laser ignition device, comprising a Q-switched, pumped solid-state laser with a pulsed pumped light source, a solid laser crystal embedded in a resonator, a Q-switch for increasing the power density, at least one output mirror and a focusing device, by means of which the laser beam may be focused in a combustion chamber, wherein the pumped light source, resonator plus laser crystal, Q-switch, output mirror, focusing device and a cooling device for cooling the resonator are integrated in a single component which can be inserted into a spark-plug shaft.

2. The internal combustion engine according to claim 1, wherein the Q-switch is provided with a passive configuration.

3. The internal combustion engine according to claim 1, wherein the focusing device comprises a single focusing lens.

4. The internal combustion engine according to claim 1, wherein the cooling device comprises at least two different cooling systems.

5. The internal combustion engine according to claim 4, wherein the cooling device comprises three different cooling systems.

6. The internal combustion engine according to claim 1, wherein the resonator comprises at least one Peltier cooling element for cooling the pump diodes.

7. The internal combustion engine according to claim 6, wherein the resonator comprises at least one outer second coolant circulation for dissipating the heat from the Peltier cooling element.

8. The internal combustion engine according to claim 1, wherein the laser crystal is enclosed by at least one first cooling channel.

9. The internal combustion engine according to claim 8, wherein the first cooling channel is annular shaped.

10. The internal combustion engine according to claim 1, wherein the pumped light source is formed by pump diodes.

11. The internal combustion engine according to claim 10, wherein several pump diodes are arranged in a concentric manner about the laser crystal.

12. The internal combustion engine according to claim 11, wherein at least three pump diodes are arranged evenly about the laser crystal.

13. The internal combustion engine according to claim 11, wherein at least six pump diodes are arranged evenly about the laser crystal.

14. The internal combustion engine according to claim 10, wherein upon cold starting the pump diodes can be heated to operating temperature by the Peltier cooling element.

15. The internal combustion engine according to claim 10, wherein the pump diodes are connected in series.

16. A Q-switched, pumped solid state laser for a laser ignition device of an internal combustion engine, comprising a pulsed pumped light source formed by pump diodes, a solid laser crystal embedded in a resonator, a Q-switch for increasing the power density, at least one output mirror and a focusing device, with a cooling device being provided comprising at least one Peltier cooling element for cooling the resonator, wherein the cooling device comprises at least two different cooling systems, with Peltier cooling elements being associated with the first cooling system for cooling the pump diodes.

17. The solid state laser according to claim 16, wherein the cooling device comprises three different cooling systems.

18. The solid state laser according to claim 16, wherein the laser crystal is enclosed by at least one first inner cooling channel of the inner coolant circulation.

19. The solid state laser according to claim 18, wherein the first inner cooling channel is annular shaped.

20. The solid state laser according to claim 16, wherein the resonator comprises at least one outer coolant circulation associated with the third coolant system for dissipating the heat from the Peltier cooling system.

21. The solid state laser according to claim 16, wherein several pump diodes are arranged in a concentric manner about the laser crystal.

22. The solid state laser according to claim 21, wherein at least three pump diodes are arranged evenly about the laser crystal.

23. The solid state laser according to claim 21, wherein at least six pump diodes are arranged evenly about the laser crystal.

24. The solid state laser according to claim 16, wherein the pump diodes are connected in series.

25. The solid state laser according to claim 16, wherein the pump diodes are enclosed by a heat dissipater.

26. The solid state laser according to claim 25, wherein the heat dissipater is arranged between the pump diodes and the Peltier cooling elements.

27. The solid state laser according to claim 16, wherein a heat dissipater is arranged in a concentric manner about the laser crystal.

28. The solid state laser according to claim 16, wherein the heat dissipater is consisting of copper.

29. The solid state laser according to claim 16, wherein the pump diodes are enclosed by at least one row of first outer cooling channels of the first coolant circulation arranged in the direction of the axis of the solid state laser.

30. The solid state laser according to claim 29, wherein the first outer cooling channels are arranged in the heat dissipater.

31. The solid state laser according to claim 16, wherein the Peltier cooling elements are arranged in a concentric manner relative to the axis outside about the pump diodes.

32. The solid state laser according to claim 16, wherein the Peltier cooling elements are enclosed by a heat exchanger of the third cooling system.

33. The solid state laser according to claim 32, wherein the Peltier elements are arranged in a concentric manner relative to the axis of the solid state laser.

34. The solid state laser according to claim 32, wherein the heat exchanger comprises at least one row of second cooling channels arranged in a substantially concentric manner about the same and in the direction of the axis of the solid state laser.

35. The solid state laser according to claim 16, wherein at least an inner coolant circulation is flowed through by a medium which is optically transparent for laser wavelength.

36. The solid state laser according to claim 16, wherein the outer coolant circulation is connected with the coolant circulation of an internal combustion engine.

37. The solid state laser according to claim 16, wherein upon cold starting the pump diodes can be heated to operating temperature by the Peltier cooling element.

38. The solid state laser according to claim 16, wherein the Q-switch is provided with a passive configuration.

39. The solid state laser according to claim 16, wherein the focusing device comprises a single focusing lens.

40. The solid state laser according to claim 16, wherein the pumped light source, resonator plus laser crystal, Q-switch, output mirror, focusing device and the cooling device for cooling the resonator are integrated in a single component which can be inserted into a spark-plug shaft.

41. An internal combustion engine with a laser ignition device, comprising a Q-switched, pumped solid-state laser with a pulsed pumped light source, a solid laser crystal embedded in a resonator, a Q-switch for increasing power density, at least one output mirror and a focusing device, by means of which the laser beam may be focused in a combustion chamber, wherein the pumped light source, resonator plus laser crystal, Q-switch, output mirror, focusing device and a cooling device for cooling the resonator are integrated in a single component which can be inserted into a spark-plug shaft, wherein the resonator comprises an inner first coolant circulation for cooling the laser crystal.

42. A Q-switched, pumped, solid state laser for a laser ignition device of an internal combustion engine, comprising a pulsed pumped light source formed by pump diodes, a solid laser crystal embedded in a resonator, a Q-switch for increasing power density, at least one output mirror and a focusing device, and a cooling device comprising at least one Peltier cooling element for cooling the resonator, wherein the cooling device comprises at least first and second different cooling systems, with Peltier cooling elements being associated with the first cooling system for cooling the pump diodes, wherein the resonator comprises an inner coolant circulation associated with the second cooling system for cooling the laser crystal.

* * * * *